United States Patent
Zhou et al.

(10) Patent No.: US 8,568,617 B2
(45) Date of Patent: Oct. 29, 2013

(54) METHOD OF PRODUCING ELECTRODE MATERIAL PRECURSOR AND ELECTRODE MATERIAL USING THE ELECTRODE MATERIAL PRECURSOR

(75) Inventors: Haoshen Zhou, Ibaraki (JP); Yonggang Wang, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 210 days.

(21) Appl. No.: 13/057,281

(22) PCT Filed: Aug. 6, 2009

(86) PCT No.: PCT/JP2009/063945
§ 371 (c)(1),
(2), (4) Date: Feb. 22, 2011

(87) PCT Pub. No.: WO2010/016545
PCT Pub. Date: Feb. 11, 2010

(65) Prior Publication Data
US 2011/0133131 A1    Jun. 9, 2011

(30) Foreign Application Priority Data
Aug. 6, 2008 (JP) ................................. 2008-202754

(51) Int. Cl.
*H01B 1/04* (2006.01)
*B05D 7/00* (2006.01)

(52) U.S. Cl.
USPC .................... 252/502; 252/518.1; 427/220

(58) Field of Classification Search
USPC ......... 252/500, 502, 518.1; 528/422; 427/220
See application file for complete search history.

(56) References Cited

U.S. PATENT DOCUMENTS

| 6,641,759 | B1 | 11/2003 | Harada et al. |
| 7,285,260 | B2 | 10/2007 | Armand et al. |
| 7,457,018 | B2 | 11/2008 | Armand et al. |
| 7,601,318 | B2 | 10/2009 | Armand et al. |
| 7,618,747 | B2 | 11/2009 | Audemer et al. |
| 2004/0033360 | A1 | 2/2004 | Armand et al. |

(Continued)

FOREIGN PATENT DOCUMENTS

| JP | 2002-358959 A | 12/2002 |
| JP | 2003-292309 A | 10/2003 |

OTHER PUBLICATIONS

K. Abiko et al., "Synthesys and Carbon Coating Effect of Olivine-Type LiFePO4 Prepared by Aqueous Solution Method", pp. 56-57, Nov. 2007.

*Primary Examiner* — Mark Kopec
*Assistant Examiner* — Jaison Thomas
(74) *Attorney, Agent, or Firm* — Howson & Howson LLP

(57) ABSTRACT

Provided is a method of producing an electrode material precursor having a core-shell structure in which the particle size is extremely small and the particle diameter is uniform, and a method of efficiently producing an electrode material using the obtained precursor. The method is for producing an electrode material precursor having a core-shell structure in which an active material core is coated with polyaniline, wherein an oxidizing agent is added to a solution containing aniline and an active raw material to generate fine active material particles, and aniline is polymerized at the surface of the fine particles. An electrode material having a core-shell structure in which an active material core is coated with carbon is produced by subjecting the electrode material precursor obtained in the foregoing production method to heat treatment in a reduction atmosphere at 300 to 900° C.

11 Claims, 3 Drawing Sheets

(56) References Cited

U.S. PATENT DOCUMENTS

| | | |
|---|---|---|
| 2005/0208380 A1 | 9/2005 | Park et al. |
| 2006/0035150 A1 | 2/2006 | Audemer et al. |
| 2007/0134554 A1 | 6/2007 | Armand et al. |
| 2009/0072203 A1 | 3/2009 | Audemer et al. |
| 2009/0200508 A1 | 8/2009 | Nagase et al. |
| 2010/0065787 A1 | 3/2010 | Armand et al. |

METHOD OF PRODUCING ELECTRODE MATERIAL PRECURSOR AND ELECTRODE MATERIAL USING THE ELECTRODE MATERIAL PRECURSOR

TECHNICAL FIELD

The present invention relates to a method of producing an electrode material precursor having a core-shell structure for use in a lithium secondary battery and the like, and to a method of producing an electrode material using the obtained electrode material precursor.

BACKGROUND ARTS

Conventionally, as an electrode material for use in various secondary batteries such as a lithium secondary battery, various electrode materials having a core-shell structure in which coating made of a conductive substance is formed on the surface of an active material core made of oxides of metals such as lithium, manganese have been proposed. Moreover, as coating made of a conductive substance, the production of an electrode material coated with polymer such as polyaniline by polymerizing a polymeric compound at the surface of active material core particles is also known (for example, refer to Patent Documents 1 to 3).

[Patent Document 1] Japanese Unexamined Patent Application Publication No. 2001-118570
[Patent Document 2] Japanese Unexamined Patent Application Publication No. 2002-358959
[Patent Document 3] Japanese Examined Patent Application Publication No. 2007-522619

DISCLOSURE OF THE INVENTION

Nevertheless, the technologies described in the foregoing Patent Documents oxidize and polymerize the polymeric compound in a liquid with active material core particles, which were prepared in advance, dispersed therein. Thus, if the active material core particle size becomes small it is difficult to disperse the active material core particles in the liquid uniformly, and, since the size of the particles will increase due to flocculation and growth, it was extremely difficult to obtain an electrode material or its precursor having a core-shell structure in which the particle size is extremely small and the particle diameter is uniform.

Accordingly, an object of this invention is to resolve the problems of the foregoing conventional technologies and provide a method for producing an electrode material precursor having a core-shell structure in which the particle size is extremely small and the particle diameter is uniform, and a method for efficiently producing an electrode material using the obtained precursor.

MEANS FOR SOLVING THE PROBLEMS

As a result of intense study, the present inventors discovered that the foregoing problems can be resolved by adding an oxidizing agent to a solution containing aniline and an active raw material to generate fine active material particles, and by polymerizing aniline at the surface of the fine particles, and thereby completed this invention.

Specifically, the present invention adopts the configuration of 1 to 11 below.

1. A method of producing an electrode material precursor having a core-shell structure in which an active material core is coated with polyaniline, wherein an oxidizing agent is added to a solution containing aniline and an active raw material to generate fine active material particles, and aniline is polymerized at the surface of the fine particles.

2. The method of producing an electrode material precursor according to paragraph 1 above, wherein the average particle diameter of the electrode material precursor is 5 to 1,000 nm.

3. The method of producing an electrode material precursor according to paragraph 1 or paragraph 2 above, wherein phosphate is used as the active raw material and salt of trivalent iron is used as the oxidizing agent in order to obtain an electrode material precursor having a core of $FePO_4$ iron (III) phosphate.

4. The method of producing an electrode material precursor according to paragraph 1 or paragraph 2 above, wherein $Ti(OC_nH_{2n+1})_4$ is used as the active raw material (wherein n represents an integer of 1 to 5 in the formula), and $(NH_4)_2S_2O_8$ or salt of trivalent iron is used as the oxidizing agent in order to obtain an electrode material precursor having a core of $TiO_2$.

5. The method of producing an electrode material precursor according to paragraph 1 or paragraph 2 above, wherein an aqueous solution of permanganate is added to an organic solvent solution containing aniline in order to obtain an electrode material precursor having an active material core of $MnO_2$.

6. A method of producing an electrode material having a core-shell structure in which an active material core is coated with carbon, wherein the electrode material precursor obtained in the method according to any one of paragraphs 1 to 5 above is subject to heat treatment in a reduction atmosphere at 300 to 900° C.

7. The method of producing an electrode material according to paragraph 6 above, wherein the heat treatment is performed in a reduction atmosphere containing 0.1 to 10% (volume %) of hydrogen.

8. The method of producing an electrode material according to paragraph 6 or paragraph 7 above, wherein the electrode material obtained in the method according to paragraph 3 above is subject to the heat treatment in the reduction atmosphere in the presence of lithium salt and sugar in order to obtain an electrode material having an active material core of $LiFePO_4$.

9. The method of producing an electrode material according to paragraph 6 or paragraph 7 above, wherein the electrode material obtained in the method of paragraph 4 above is subject to the heat treatment in the reduction atmosphere in the presence of lithium salt in order to obtain an electrode material having an active material core of $Li_4Ti_5O_{12}$.

10. The method of producing an electrode material according to paragraph 6 or paragraph 7 above, wherein the electrode material obtained in the method of paragraph 5 above is subject to the heat treatment in the reduction atmosphere in order to obtain an electrode material having an active material core of $Mn_3O_4$.

11. The method of producing an electrode material according to any one of paragraphs 6 to 10 above, wherein the average particle diameter of the electrode material is 5 to 1,000 nm.

EFFECT OF THE INVENTION

The present invention yields the following prominent effects as a result of adopting the foregoing configuration.
(1) Since the polyaniline coating is formed by using a solution with a raw material substance of an active material core dissolved therein, and not a liquid with an active material core dispersed therein, and polymerizing aniline at the surface of fine particles that are obtained simultaneously with generating active material core fine particles in the solution, it is possible to inhibit the growth and flocculation of the active material core fine particles, and efficiently obtain an electrode material precursor having a core-shell structure in which the particle size is extremely small and the particle diameter is uniform.

(2) As a result of subjecting the obtained electrode material precursor having a core-shell structure coated with polyaniline to heat treatment in a reduction atmosphere at 300 to 900° C., it is possible to efficiently produce an electrode material with superior characteristics having a core-shell structure in which its active material core is coated with carbon, the particle size is extremely small, and the particle diameter is uniform.

BEST MODE FOR CARRYING OUT THE INVENTION

Figure 1:
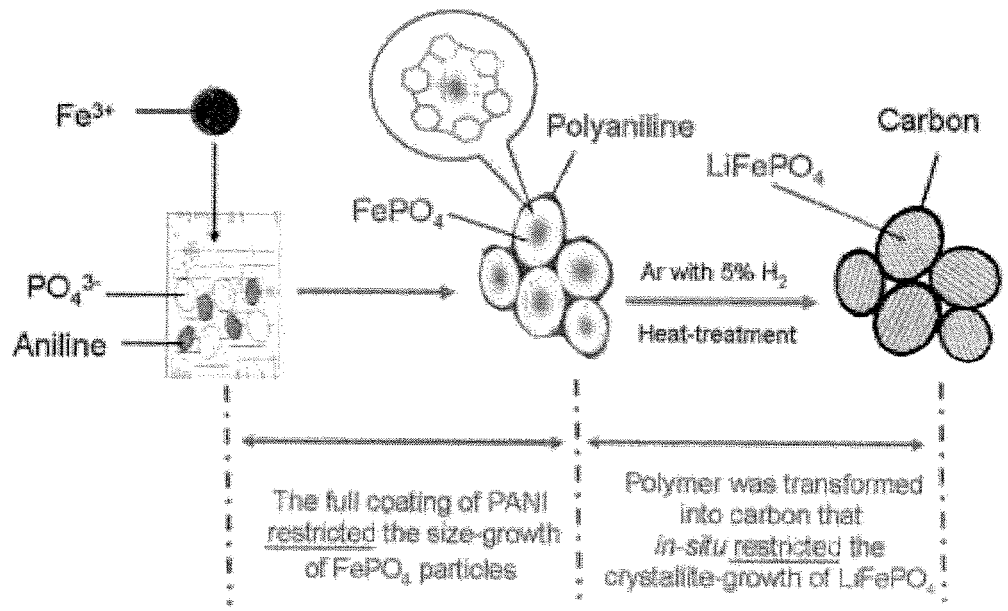
FIG. 1 is a diagram explaining the reaction process for producing the electrode material precursor and the electrode material in the first embodiment of the present invention.

The present invention produces an electrode material precursor having a core-shell structure in which an active material core is coated with polyaniline by adding an oxidizing agent to a solution containing aniline and an active raw material to generate fine active material particles, and by polymerizing aniline at the surface of the fine particles.

Subsequently, the obtained electrode material precursor is subject to heat treatment in a reduction atmosphere at 300 to 900° C. in order to carbonize the polyaniline coating, and obtain an electrode material having a core-shell structure in which an active material core is coated with carbon.

Embodiments of the present invention are now explained in order, but the present invention shall not be limited to the specific examples.

First Embodiment

In the first embodiment of the present invention, phosphate is used as the active raw material and salt of trivalent iron is used as the oxidizing agent in order to obtain an electrode material precursor having a thin polyaniline coating (shell) and in which the active material core is $FePO_4$ iron (III) phosphate.

As the phosphate to be used as the active raw material, for example, monoammonium phosphate ($NH_4H_2PO_4$), diammonium phosphate (($NH_4)_2HPO_4$), triammonium phosphate (($NH_4)_3PO_4$) may be used. And, as examples of the salt of trivalent iron to be used as the oxidizing agent, $FeCl_3$, $Fe(NO)_3$, $Fe(CH_3COO)_3$, may be used.

As the specific procedures of this embodiment, for example, an aqueous solution containing phosphate and aniline is agitated, and an aqueous solution containing salt of trivalent iron is delivered therein in drops. The reaction will advance according to the following Chemical Formulae (1) and (2). However, since the rate of reaction of Formula (1) is faster than the rate of reaction of Formula (2), $FePO_4$ foremost becomes precipitated as fine particles, and the oxidation and polymerization of aniline at the surface of the generated fine $FePO_4$ particles subsequently take place. Here, the salt of trivalent iron functions as a precipitant in Formula (1) and as an oxidizing agent in Formula (2).

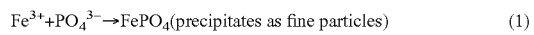

$$Fe^{3+} + PO_4^{3-} \rightarrow FePO_4 \text{(precipitates as fine particles)} \quad (1)$$

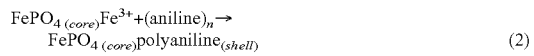

$$FePO_{4\,(core)}Fe^{3+} + (aniline)_n \rightarrow FePO_{4\,(core)} polyaniline_{(shell)} \quad (2)$$

Since the polyaniline coating formed on the surface of the fine $FePO_4$ particles effectively inhibit the growth and flocculation of the size of the fine particles, it is possible to efficiently obtain an electrode material precursor having a core-shell structure in which the particle size is extremely small and the particle diameter is uniform.

By subjecting the obtained electrode material precursor having a core-shell structure in which the polyaniline coating is formed on the surface of the fine $FePO_4$ particles to heat treatment, for example, in a reduction atmosphere containing 0.1 to 10% (volume %) of hydrogen at a temperature of 300 to 900° C. in the presence of lithium salt and sugar, it is possible to obtain an electrode material having a core-shell structure coated with carbon and having an active material core of $LiFePO_4$. Since this electrode material has a core-shell structure in which the particle size is extremely small and the particle diameter is uniform, it exhibits extremely superior properties as an electrode material for configuring a lithium secondary battery.

The reaction process for producing the foregoing electrode material precursor and electrode material is shown in FIG. 1. Moreover, the specific procedures are described in the following Examples.

Example 1

Figure 2:
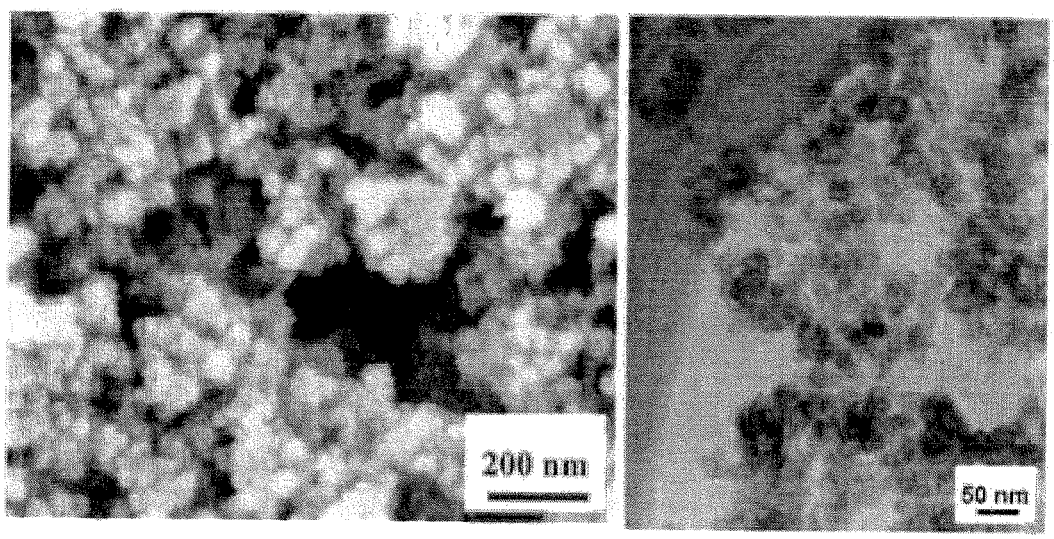
FIG. 2 is an image of the electrode material precursor obtained in Example 1 taken with a transmission electrode microscope.

While agitating an aqueous solution in which 2.62 g of $NH_4H_2PO_4$ and 1 ml of aniline were dissolved in 200 ml of distilled water, an aqueous solution in which 3.7 g of $FeCl_3$ were dissolved in 100 ml of distilled water was gradually added to the foregoing aqueous solution, and this was agitated for 5 hours at room temperature. Composite particles having a core-shell structure in which polyaniline (PANI) coating was formed on the surface of the obtained fine $FePO_4$ particles were filtered and washed 7 times with distilled water to obtain an electrode material precursor having an average particle diameter of 20 to 40 nm. The image of the obtained $FePO_4$ (core)/PANI (shell) electrode material precursor taken with a transmission electron microscope is shown in FIG. 2.

Example 2

The $FePO_4$ (core)/PANI (shell) electrode material precursor obtained in Example 1 was mixed with $CH_3COOLi$ of an equivalent molar amount as $FePO_4$ and approximately 25 wt % of sugar relative to the foregoing raw materials, and homogenized by performing milling for 1 hour. Subsequently, moisture was eliminated by heating the foregoing electrode material precursor in an Ar atmosphere containing 5 volume % of hydrogen at 400° C. for 4 hours, and additionally performing heat treatment thereto in an Ar atmosphere containing 5 volume % of hydrogen at 700° C. for 15 hours in order to obtain an electrode material having a core-shell structure coated with carbon in which the average particle diameter is 20 to 40 nm and the active material core is LiFePO$_4$.

Figures 3, 4:
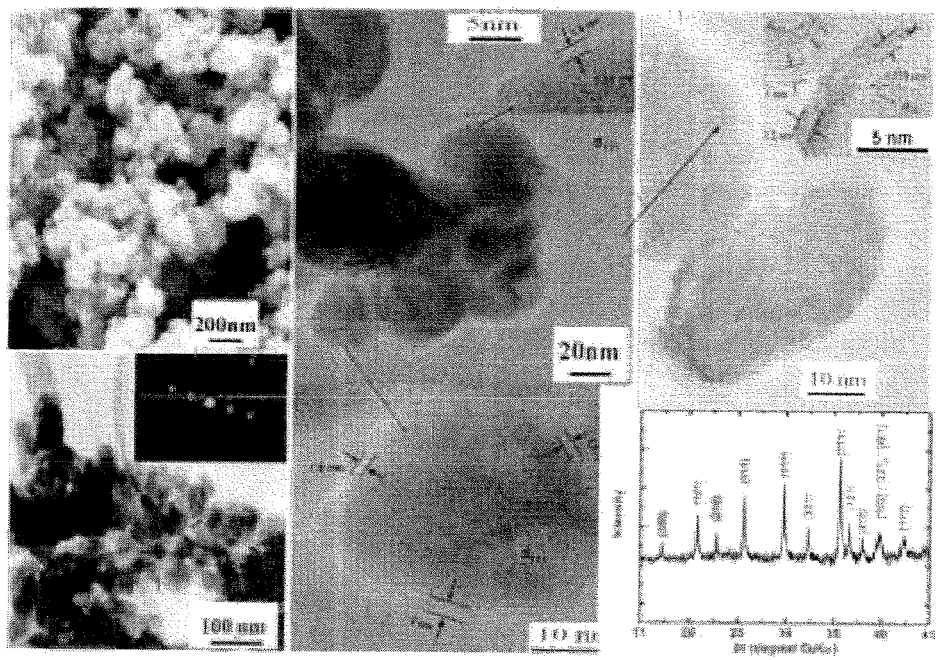
FIG. 3 is an image of the electrode material obtained in Example 2 taken with an electron microscope, and an X-ray diffraction diagram thereof.
FIG. 4 is a diagram showing the electrode characteristics of the electrode material obtained in Example 2.

The image of the obtained electrode material taken with an electron microscope and an X-ray diffraction diagram thereof are shown in FIG. 3.

FIG. 3a is the image of the scanning electron microscope (SEM), FIGS. 3b to 3d are the images of the transmission electron microscope (TEM), and FIG. 3e is the X-ray diffraction diagram.

FIG. 3a shows the structure where numerous primary particles have flocculated. According to FIGS. 3b and 3c, the particle diameter of these primary particles is 20 to 40 nm, and it was confirmed that the respective primary particles are completely coated with carbon coating that was formed based on the carbonization of polyaniline.

Moreover, upon comparing FIG. 2 and FIG. 3, it is evident that the growth of LiFePO$_4$ is effectively inhibited with the electrode material of Example 2 having a core-shell structure coated with carbon and an active material core of LiFePO$_4$ which was obtained by performing heat treatment to the electrode material precursor obtained in Example 1.

(Electrode Characteristics of Electrode Material)

The electrode characteristics of the electrode material obtained in Example 2 were measured as follows.

The electrode material having a core-shell structure coated with carbon and with a core of LiFePO$_4$ obtained in Example 2 was mixed with 12% of conductive additive (Acetylene Black) and 5% of binder (PTFE=Polytetrafluoroethylene), and a lithium ion battery was prepared with the EC/DMC (1/1 volume ratio) as the positive electrode of the lithium ion battery and an electrolytic solution, and metallic lithium as the negative electrode. The results upon evaluating the performance of the obtained battery are shown in FIG. 4.

As shown in FIG. 4, if current of 0.1 A/a (corresponds to 0.6 C) is discharged, a capacity of the approximate logical capacity value of 168 mAh/g was obtained. Also, owing to coated carbon shell, a capacity of 90 mAh/g was obtained even if a large current of 10 A/g (corresponds to 60 C) is discharged. This is currently the world's highest rate characteristics of LiFePO$_4$. In addition, hardly any deterioration in the capacity was observed even after 1100 charge/discharge cycles at approximately 100% of SOC and DOD (State of Charge and Depth of Discharge).

Second Embodiment

In the second embodiment of the present invention, Ti(OC$_n$H$_{2n+1}$)$_4$ was used as the active raw material (wherein n represents an integer of 1 to 5 in the formula), and (NH$_4$)$_2$S$_2$O$_8$ or salt of trivalent iron was used as the oxidizing agent in order to obtain an electrode material precursor having an active material core of TiO$_2$.

As a preferred active raw material, for example, Ti(OC$_3$H$_7$)$_4$ may be used. Moreover, as a preferred oxidizing agent, (NH$_4$)$_2$S$_2$O$_8$ may be used, but the salt of trivalent iron used in the foregoing first embodiment may also be used.

An example of the procedures for producing the electrode material precursor and electrode material according to the second embodiment is now explained based on the following Examples.

Example 3

While agitating an aqueous solution in which 2.0 g of Ti(OC$_3$H$_7$)$_4$ and 1 ml of aniline were dissolved in 200 ml of distilled water, an aqueous solution in which 2.3 g of (NH$_4$)$_2$S$_2$O$_8$ were dissolved in 100 ml of distilled water was gradually added to the foregoing aqueous solution, and this was agitated for 6 hours at 60° C. Composite particles having a core-shell structure in which polyaniline (PANI) coating was formed on the surface of the obtained fine TiO$_2$ particles were filtered and washed several times with distilled water to obtain an electrode material precursor having an average particle diameter of 20 to 80 nm.

Example 4

Figure 5:
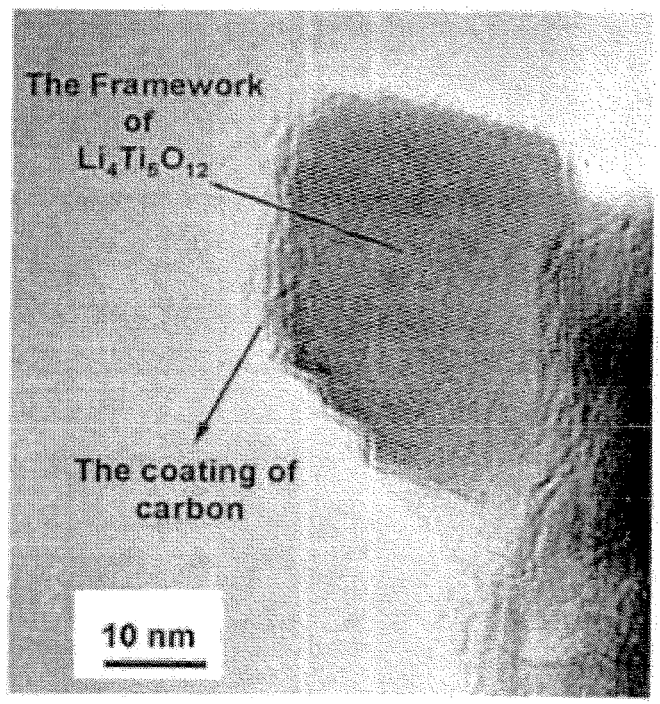
FIG. 5 is an image of the electrode material obtained in Example 4 taken with a transmission electron microscope.

The TiO$_2$ (core)/PANI (shell) electrode material precursor obtained in Example 3 was mixed with CH$_3$COOLi of an equivalent molar amount as TiO$_2$ and homogenized by performing milling for 1 hour. Subsequently, moisture was eliminated by heating the foregoing electrode material precursor in an Ar atmosphere containing 5 volume % of hydrogen at 400° C. for 4 hours, and additionally performing heat treatment thereto in an Ar atmosphere containing 5 volume % of hydrogen at 850° C. for 24 hours in order to obtain an electrode material having a core-shell structure coated with carbon in which the average particle diameter is 20 to 40 nm and the active material core is Li$_4$Ti$_5$O$_{12}$. The image of the obtained Li$_4$Ti$_5$O$_{12}$ (core)/C (shell) electrode material taken with a transmission electron microscope is shown in FIG. 5.

Third Embodiment

In the third embodiment of the present invention, an aqueous solution of permanganate is added to a CCl$_4$ organic solvent solution containing aniline in order to obtain an electrode material precursor having an active material core of MnO$_2$.

An example of the procedures for producing the electrode material precursor and electrode material according to the third embodiment is now explained based on the following Examples.

Example 5

By adding an aqueous solution in which 0.1 g of KMnO$_4$ were dissolved in 100 ml of distilled water while agitating a solution in which 2 ml of aniline was dissolved in 100 ml of distilled water, fine MnO$_2$ particles were generated at the interface of CCl$_4$ and water, and composite particles having a core-shell structure in which polyaniline coating was formed on the surface of the fine particles were obtained. The composite particles were filtered and washed with distilled water to obtain an electrode material precursor having an average particle diameter of 20 to 40 nm.

Example 6

By heating the MnO$_2$ (core)/PANI (shell) electrode material precursor obtained in Example 5 in an Ar atmosphere at 400° C. for 1 hour, an electrode material having a core-shell structure coated with carbon with an average particle diameter of 20 to 40 nm and having an active material core of Mn$_3$O$_4$ was obtained.

Figure 6:
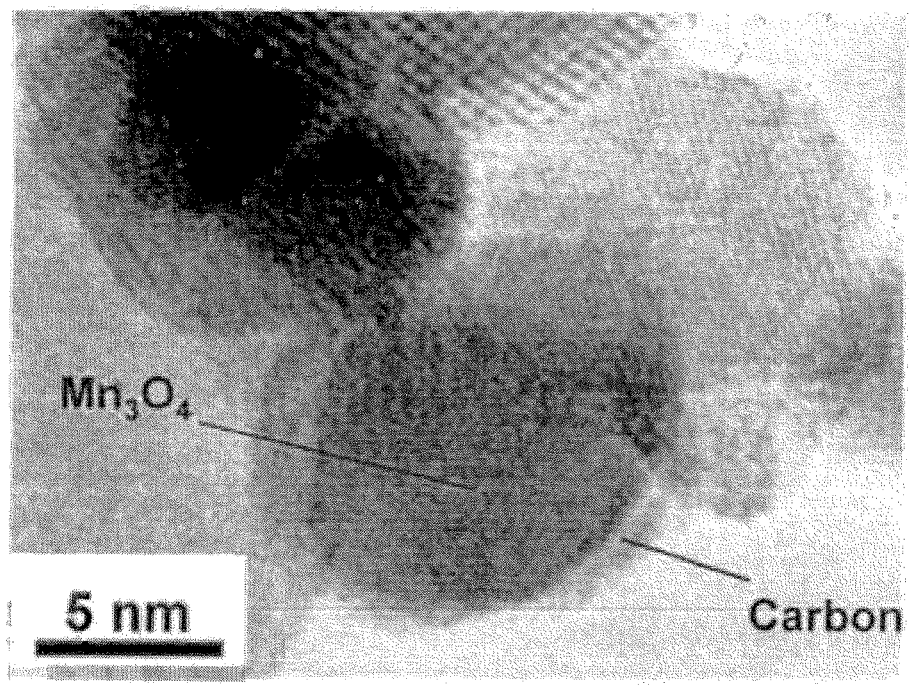
FIG. 6 is an image of the electrode material obtained in Example 6 taken with a transmission electron microscope.

The image of the obtained Mn$_3$O$_4$ (core)/C (shell) electrode material taken with a transmission electron microscope is shown in FIG. 6.

The invention claimed is:
1. A method of producing a precursor material for an electrode material of a lithium secondary battery, wherein the precursor material has a core-shell structure, said core being made of a precursor of an active material of the lithium secondary battery and coated with the shell of polyaniline, the method comprising a step of adding an oxidizing agent to a solution containing aniline and a raw material for the active material precursor to generate particles of the active material precursor, and to cause aniline to be polymerized into polyaniline on the surface of the particles of the active material precursor.

2. The method of producing a precursor material according to claim 1, wherein the average diameter of the particles is 5 to 1,000 nm.

3. The method of producing a precursor material according to claim 1 or claim 2, wherein phosphate is used as the raw material and salt of trivalent iron is used as the oxidizing agent in order to obtain precursor material having a core of $FePO_4$ iron (III) phosphate.

4. The method of producing a precursor material according to claim 1 or claim 2, wherein $Ti(OC_nH_{2n+1})_4$ is used as the raw material, wherein n represents an integer of 1 to 5 in the formula, and $(NH_4)_2S_2O_8$ or salt of trivalent iron is used as the oxidizing agent in order to obtain precursor material having a core of $TiO_2$.

5. The method of producing a precursor material according to claim 1 or claim 2, wherein an aqueous solution of permanganate is added to an organic solvent solution containing aniline in order to obtain precursor material having a core of $MnO_2$.

6. A method of producing having a core-shell structure in which an active material core is coated with carbon, comprising the steps of producing a precursor material having a core-shell structure in which an active material core is coated with polyaniline by adding an oxidizing agent to a solution containing aniline and an active raw material to generate fine active material particles and to cause aniline to be polymerized on the surface of the fine particles, the precursor material to heat treatment in a reduction atmosphere at 300 to 900° C.

7. The method of producing an electrode material according to claim 6, wherein the heat treatment is performed in a reduction atmosphere containing 0.1 to 10% (volume %) of hydrogen.

8. The method of producing an electrode material according to claim 6 or claim 7, wherein phosphate is used as the active raw material and salt of trivalent iron is used as the oxidizing agent in order to obtain precursor material having a core of $FePO_4$ iron (III) phosphate, wherein the precursor material is subject to the heat treatment in the reduction atmosphere in the presence of lithium salt and sugar in order to obtain an electrode material having an active material core of $LiFePO_4$.

9. The method of producing an electrode material according to claim 6 or claim 7, wherein $Ti(OC_nH_{2n+1})_4$ is used as the active raw material, wherein n represents an integer of 1 to 5 in the formula and $(NH_4)_2S_2O_8$ or salt of trivalent iron is used as the oxidizing agent in order to obtain precursor material having a core of $TiO_2$, wherein the precursor material is subject to the heat treatment in the reduction atmosphere in the presence of lithium salt in order to obtain an electrode material having an active material core of $Li_4Ti_5O_{12}$.

10. The method of producing an electrode material according to claim 6 or claim 7, wherein an aqueous solution of permanganate is added to an organic solvent solution containing aniline in order to obtain precursor material having an active material core of $MnO_2$, wherein the precursor material is subject to the heat treatment in the reduction atmosphere in order to obtain an electrode material having an active material core of $Mn_3O_4$.

11. The method of producing an electrode material according to claim 6, wherein the average particle diameter of the electrode material is 5 to 1,000 nm.

* * * * *

UNITED STATES PATENT AND TRADEMARK OFFICE
CERTIFICATE OF CORRECTION

PATENT NO. : 8,568,617 B2
APPLICATION NO. : 13/057281
DATED : October 29, 2013
INVENTOR(S) : Zhou et al.

It is certified that error appears in the above-identified patent and that said Letters Patent is hereby corrected as shown below:

In the Specification

Column 5, line 35, "A/a" should read "A/g"

In the Claims

Column 7, line 27, claim 6, "producing" should read "producing an electrode material"

Column 7, line 34, claim 6, "particles," should read "particles, and subjecting"

Signed and Sealed this
Twenty-fourth Day of December, 2013

Margaret A. Focarino
*Commissioner for Patents of the United States Patent and Trademark Office*